No. 685,022. Patented Oct. 22, 1901.
N. WILLIAMS.
COMBINED FORK, HOE, AND RAKE.
(Application filed Feb. 26, 1901.)

(No Model.)

WITNESSES:

INVENTOR,
Nate Williams,
BY
Milo B. Stevens & Co.
ATTORNEYS.

THE NORRIS PETERS CO., PHOTO-LITHO., WASHINGTON, D. C.

UNITED STATES PATENT OFFICE.

NATE WILLIAMS, OF OWOSSO, MICHIGAN.

COMBINED FORK, HOE, AND RAKE.

SPECIFICATION forming part of Letters Patent No. 685,022, dated October 22, 1901.

Application filed February 26, 1901. Serial No. 48,904. (No model.)

*To all whom it may concern:*

Be it known that I, NATE WILLIAMS, a citizen of the United States, residing at Owosso, in the county of Shiawassee and State of Michigan, have invented certain new and useful Improvements in a Combined Fork, Hoe, and Rake; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a combined fork, hoe, and rake, and has for its object, primarily, an attachment adapted to be applied to a fork in a manner to be elevated and lowered to convert the fork into a rake or hoe, as may be desired.

The invention contemplates the employment of an elongated metallic blade provided on the one edge with a hoe and on the opposite edge with rake-teeth, and means for elevating and lowering this blade upon the tines of the fork, and means for locking the same in various positions.

The various details in the construction and arrangement of the several parts will be readily apparent upon an inspection of the accompanying drawings when taken in connection with the specification and the appended claims.

In said drawings an embodiment of the invention is shown for the purpose of illustration, and when hereinafter referring to the same like letters of reference refer to corresponding parts in both views.

Figure 1:
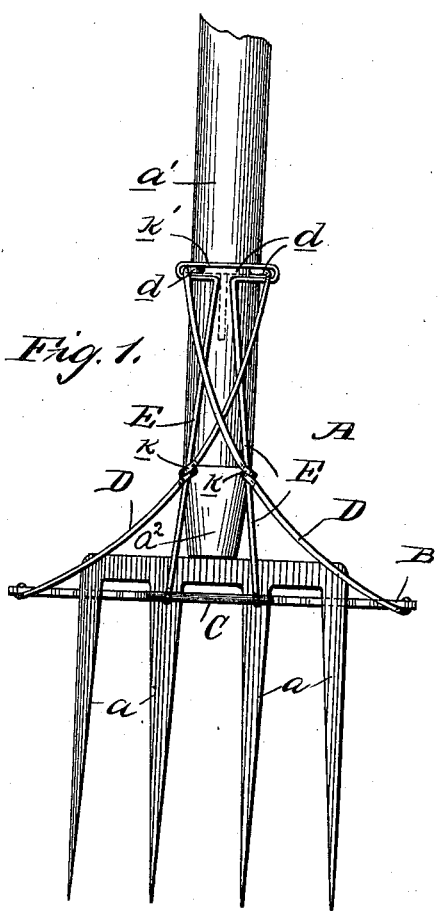
Figure 2:
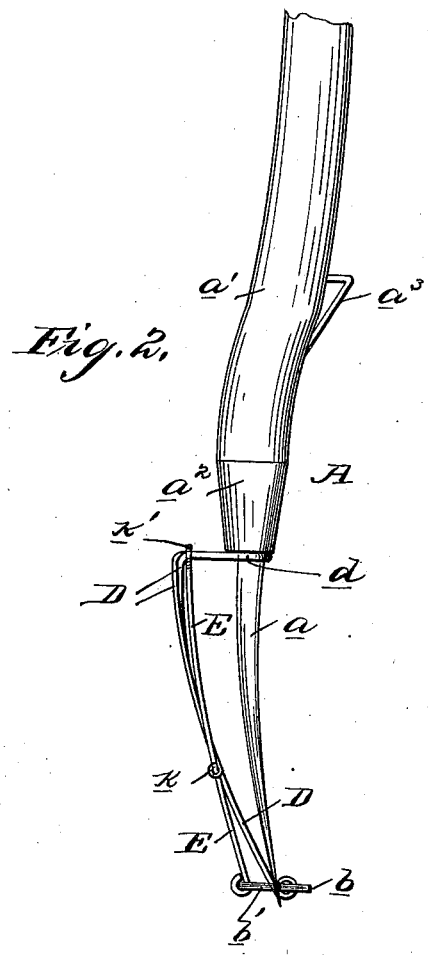
Figure 3:
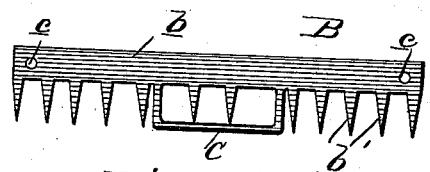

Figure 1 is a plan view of the construction complete, the parts being shown in one adjusted position, and Fig. 2 is a side elevation thereof, the parts being shown in the opposite position.

Referring more specifically to the drawings, A designates a fork of any ordinary or preferred construction, comprising the tines $a$ and the elongated handle $a'$, connected thereto through the medium of the ferrule $a^2$. Upon the lower surface of the fork a lug or projecting portion $a^3$ is provided for purposes to be hereinafter pointed out.

Adapted to slide up and down upon the tines of the fork in an obvious manner is an elongated blade B, the same constituting on one edge a hoe $b$ and on the opposite edge the rake $b'$. When it is desired to use the implement as a hoe or rake, the blade is in its lowermost position at the ends of the tines of the fork, (best seen in Fig. 2,) and when it is desired to use the fork without interference from the other portions of the implement the blade is elevated into its uppermost position, as indicated in Fig. 1. As an efficient means for elevating and lowering the blade the following mechanism is employed: To that edge of the blade upon which the rake-teeth are formed a bracket C is provided, and at the extreme ends of the blade the eyelets $c$ are formed. In the eyelets the supporting wires or rods D are secured, the same projecting toward the handle $a'$ and at their upper ends crossed and running parallel with the upper surface of said handle. The ends of these wires are connected by the loop $d$, adapted to surround the handle, as shown. This loop portion is designed to form a catch to engage over the projecting portion or lug on the handle to hold the plate in elevated position or beneath the end of the ferrule thereon to retain the blade in its lowermost position. That the operation of this catch may be automatic and efficient, I attach to the bracket C the ends of arched spring wires or rods E, the same being confined in their movement by loops $k$, formed in the supporting wires or rods heretofore mentioned. The upper ends of the spring-rods are connected to form a T-head $k'$, through the respective ends of which the supporting-rods pass and are limited in their lateral movement.

It will thus be seen that as the blade, with its supporting wires or rods, is elevated or lowered the connecting-loop at the upper end thereof will be automatically engaged with the projection on the handle or beneath the ferrule thereof by reason of the upward tendency of the spring-arms which engage beneath the extreme upper ends of said supporting-rods. To disengage the catch or loop, it is simply necessary to press upon the ends of the supporting rods and springs with the thumb, so as to lower the loop in an obvious manner.

The attachment may be placed upon the opposite side of the fork to that shown, if desired.

Having thus described the invention, what is claimed as new, and desired to be secured by Letters Patent, is—

1. In combination with a fork, an elongated blade of substantially the character described, adapted to slidably engage the tines of the fork, means for operating said blade, and a catch adapted to engage the handle to lock the attachment in adjusted position, substantially as described.

2. In combination with a fork, a lug on the handle thereof, an elongated blade of substantially the character described, adapted to slidably engage the tines of the fork, means for operating said blade comprising supporting-rods, means on said rods for engaging the lug on the handle, and a spring adapted to give an upward tendency to the supporting-rods, substantially as described.

3. In combination with a fork, a blade substantially of the character described, adapted to slidably engage the tines of the fork, and means for operating said blade comprising supporting-rods connected to the respective ends thereof and arranged at their upper ends to run substantially parallel with the handle and a connecting-loop at the ends of the rods adapted to extend around the handle, and means adapted to engage said loop to secure the blade in adjusted positions, substantially as described.

4. In combination with a fork, an elongated blade of substantially the character described adapted to slidably engage the tines of the fork, means for operating said blade comprising supporting-rods, a loop connecting the ends of said rods extending around the handle of the fork, a spring adapted to force said loop into contact with the handle, and means adapted to engage the loop to retain the blade in adjusted positions, substantially as described.

5. In combination with a fork, an elongated blade of substantially the character described adapted to slidably engage upon the tines of the fork, and means for operating said blade comprising supporting-rods secured to the respective ends thereof, a loop formed at the upper ends of said rods surrounding the handle of the fork, means on the fork adapted to be engaged by said loop to lock the blade in adjusted positions, and a spring secured at one end to the blade and at its opposite end engaging the looped ends of the supporting-rods, substantially as described.

6. In combination with a fork, an elongated blade of substantially the character described, adapted to slidably engage the tines of the fork, means for operating said blade comprising supporting-rods secured at the respective ends thereof, a loop connecting the upper ends of said rods, means on the handle of the fork adapted to engage said loop to lock the blade in adjusted positions, and the spring secured at one edge of the blade, and at its upper end formed into a T-shaped head through which the supporting-rods pass, and loops intermediate of the ends of said supporting-rods for guiding the spring-rods, substantially as described.

In testimony whereof I affix my signature in presence of two witnesses.

NATE WILLIAMS.

Witnesses:
J. S. HAGGART,
WELLINGTON TRAVIS.